Patented Dec. 26, 1939

2,184,299

UNITED STATES PATENT OFFICE 2,184,299

KETO CYCLOPENTANO DIMETHYL POLY-HYDRO PHENANTHROLES AND A METHOD OF PRODUCING THE SAME

Friedrich Hildebrandt, Hohen Neuendorf, near Berlin, Germany, assignor to Schering Corporation, Bloomfield, N. J., a corporation of New Jersey No Drawing. Application August 20, 1935, Serial No. 36,984. In Germany August 22, 1934

21 Claims. (Cl. 260—397)

This invention relates to compounds of the cyclopentano polyhydro phenanthrene series and more particularly to keto cyclopentano dimethyl tetradekahydro phenanthroles and the corresponding dodekahydro compounds and a method for producing the same.

The present invention consists in transforming so-called pregnanolones, i. e., compounds of the $C_{21}$-series, into compounds of the $C_{19}$-series.

The present invention accordingly has for its general object the conversion of saturated and unsaturated compounds having the following carbon atom system of the pregnan series:

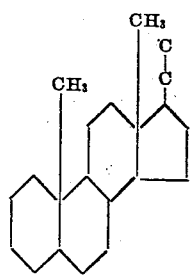

into saturated and unsaturated compounds having the following carbon atom system of the androstan series:

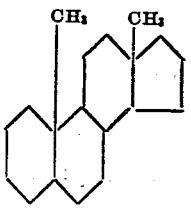

As starting materials are employed saturated and unsaturated pronanolones of the general formula $C_{21}H_xO_2$ wherein $x$ is either 34 or 32, and corresponding to the structural formula

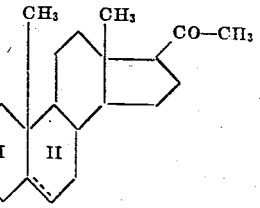

wherein in ring II there may be present a —C=C— double bond as indicated by the dotted line. These compounds are obtained, for instance, from sterols or their degradation products, the cholenic acids, according to the copending applications Serial No. 759,116 applied for December 24, 1934, now Patent No. 2,156,275, dated May 2, 1939, and Serial No. 34,599, filed August 3, 1935, or from pregnandiols or pregnandiones, for instance by reacting pregnandione with such organo-metallic compounds which, as for instance, isopropyl magnesium iodide, are capable of reducing one keto group to a secondary alcohol group. They have also been isolated from natural sources, for instance, from extracts of corpora lutea and the like.

The reaction consists in subjecting said pregnanolones to the action of organo-metallic compounds, such as Grignard reagent and the like, so as to produce a divalent secondary-tertiary alcohol, splitting off water from the tertiary hydroxy group and the neighboring hydrogen atom thereby leaving a double bond in the side chain, and thereupon treating the unsaturated alcohol obtained with oxidizing agents, such as ozone, so as to split the molecule at the point of the double bond. A keto cyclopentano dimethyl polyhydro phenanthrol is obtained having two C-atoms less than the starting material and corresponding to the general formula $C_{19}H_yO_2$ wherein $y$ is either 30 or 28, and corresponding to the following structural formula

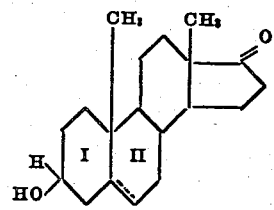

wherein in ring II there may be present a —C=C—double bond as indicated by the dotted line.

Of course, the OH-group in ring I as well as the double bond in ring II, if present, of the starting material may be protected against the action of the reagents by intermediary transformation into groups or addition of substituents which are not affected by said reagents but can be reconverted into the OH-group or removed to restore the double bond, respectively. This is done for instance, with the OH-group by substitution by halogen or by esterification or etherification, while the double bond in ring II is saturated with halogen.

The reaction may be illustrated by the following formulas:

I. Production of keto cyclopentano dimethyl tetradekahydro phenanthrol, 3-hydroxy etiocholanone-(17), from pregnanol-(3)-one-(20):

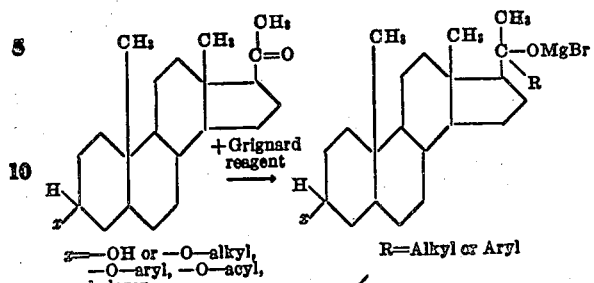

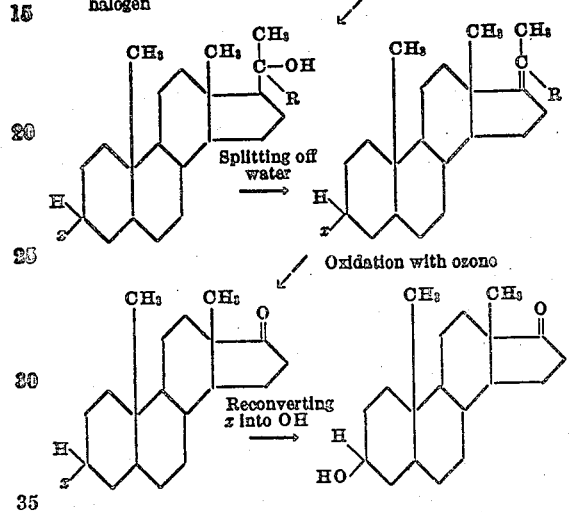

II. Production of keto cyclopentano dimethyl dodekahydro phenanthrol, 3-hydroxy etiocholenone-(17), from pregnenol-(3)-one-(20):

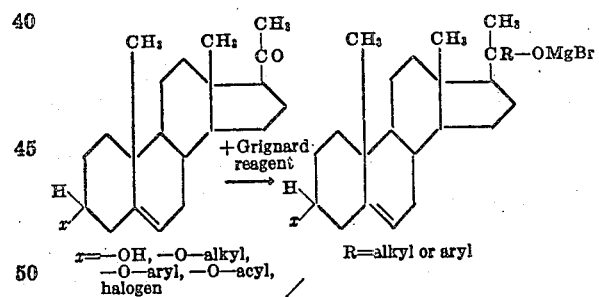

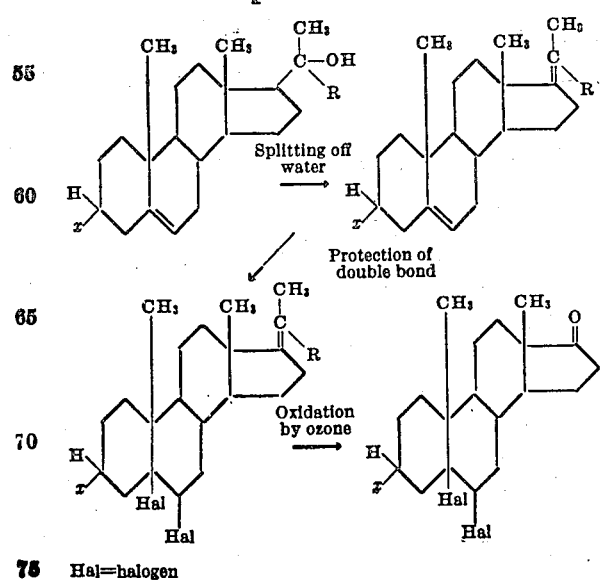

Hal=halogen

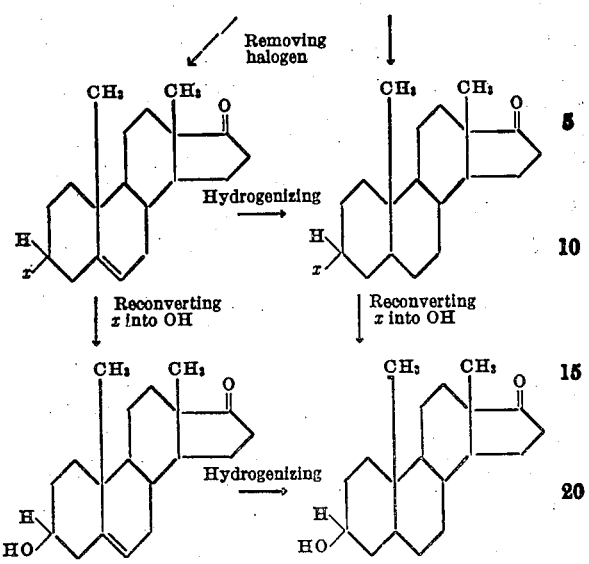

The process makes it possible to obtain by synthetic methods, that is to say, independent of urine and other starting materials which contain the male sexual hormone, products which exhibit the effects of the male sexual hormone or which by the selection of suitable starting materials and by suitable subsequent treatment can be converted into the said substance.

The following examples serve to illustrate the invention without, however, limiting the same to them:

*Example 1*

3 grams of pregnanol-(3)-one-(20) are caused to react in the cold with 6 grams of phenyl magnesium bromide in 150 cc. of ether. Thereupon the ether is distilled off and the condensation product is boiled without further purification with 25 grams of acetic acid anhydride with the addition of 5 grams of sodium acetate for 6 hours and the unsaturated acetyl compound produced thereby is purified by crystallisation from glacial acetic acid. The unsaturated acetyl compound is treated in chloroform solution with ice cooling with ozone; thereupon the ozonide solution is distilled with steam. The ester remaining as residue is purified by crystallisation from glacial acetic acid with the addition of animal charcoal and then saponified with alcoholic caustic potash. From the alcoholic solution the keto-cyclopentano-dimethyl-tetradecahydro-phenanthrol can be isolated.

*Example 2*

3 grams of allo pregnanol-(3)-one-(20) are dissolved in 80 cc. of waterfree ether. To this solution there is added a Grignard solution obtained from 12 grams of bromo benzene and 2.1 grams of magnesium in 60 cc. of ether. After boiling for several hours the ether is evaporated and the residue heated to about 100° C. for several hours, then decomposed in the cold with hydrochlorid acid and extracted with ether. The ethereal solution is steam-distilled, again extracted with ether, the ethereal extract is dried and after evaporation of the ether, is boiled with 25 grams of acetic acid anhydride. The excess of the anhydride is then removed by evaporation in a vacuum, the residue is saponified by heating with alcoholic potassium hydroxide solution, extracted with ether and evaporated to dryness.

Thereupon the unsaturated hydroxy compound is dissolved in 40 cc. of chloroform and treated with ice cooling with ozone. The reaction mixture is then diluted with water, the chloroform is driven off by steam distillation and the residue extracted with ether. After evaporation of the ether the remaining product is dissolved in alcohol and reacted in the known manner with semicarbazideacetate. The semicarbazone obtained is purified by recrystallization from alcohol and is then decomposed by heating with dilute sulfuric acid. After extraction with ether and evaporation of the same, a product is obtained which on recrystallization yields a 3-hydroxy etioallocholanone-(17) of the melting point 170° to 173° C.

On dissolving the ozonide, instead of decomposing it as described, in acetic acid ester and shaking the solution in the presence of platinum black with hydrogen there is obtained instead of the 3-hydroxy etioallocholanone-(17) the corresponding disecondary dialcohol, the 3-hydroxy etioallocholanol-(17).

*Example 3*

To an ethereal solution of methyl magnesium iodide produced from 4.28 grams of dry and degreased magnesium strips, 11 cc. of methyl iodide, 80 cc. of dry ether and a trace of iodine, there is added gradually while stirring vigorously, a solution of 2.8 grams of pregnanol-(3)-one-(20) in 100 cc. of dry ether. The reaction liquid is heated for 1 hour under reflux to boiling, whereupon the solvent is distilled off and the residue is heated for about 3 hours in an oil bath to about 120° C. After cooling, ice and dilute hydrochlorid acid (1 part acid to 5 parts water) are added in order to decompose the Grignard compound and the reaction product is extracted with ether. The ethereal extract is washed successively first very thoroughly with water, then with aqueous sodium thiosulfate solution and finally again with water, is dried and the ether evaporated. The residue is a light brown glass-like product which on analysis corresponds to the formula $C_{22}H_{36}O$. In order to complete the splitting off of water from the Grignard compound it is advisable to heat the reaction product in a high vacuum at 110° C. for about 1 hour under reflux to boiling.

2.5 grams of the dehydrated product of the formula $C_{22}H_{36}O$ are dissolved in 250 cc. of dry chloroform whereupon the solution is treated for 3 hours with ozone while cooling with ice. The chloroform is then evaporated in a vacuum at room temperature and the residue, a slightly yellowish resin, is heated for 1 hour to 50° C. with 50 cc. of glacial acetic acid thereby decomposing the ozonide. The glacial acetic acid solution is then diluted with much water, thoroughly extracted with ether and the ethereal solution is washed with water to neutral reaction. After drying the ethereal solution and evaporating the ether a tough, yellowish resin remains in a yield of about 2.5 grams. On removing the acid portion formed on ozonisation, by extraction with aqueous alkali, about 1 gram of a neutral product is obtained, which on recrystallisation yields a product of the formula $C_{19}H_{30}O_2$.

*Example 4*

1.4 grams of allo-pregnanol-(3)-one-(20) of the melting point 194° C. are dissolved in 80 cc. of ether. This solution is added while stirring to a solution of 2.5 grams of magnesium and 5.5 cc. of methyl iodide in 100 cc. of ether. Thereupon the reaction mixture is heated for several hours under reflux, the ether is distilled off, the residue is heated for several hours to 100–120° C. and then decomposed by means of ice and dilute sulfuric acid. After extraction with ether and steam distillation the unsaturated alcohol is obtained in a technically pure form and a good yield.

0.5 gram of the unsaturated alcohol is dissolved in 100 cc. of glacial acetic acid and the solution is treated while cooling with about 5% ozone. After complete ozonisation the ozonide is decomposed by heating the acetic acid solution on the water bath. On pouring the acetic acid solution into water, the oxidation product precipitates. It is extracted with ether, shaken with soda solution in order to remove the acid constituents, and freed from ether by evaporation. A crystalline product is obtained which is purified by recrystallisation from ether-petroleum ether solution and shows a melting point of about 170° C.

*Example 5*

1 gram of 3-acetyl allo-pregnanol-(3)-one-(20) is dissolved in 50 cc. of ether, the solution is added to a solution of 0.8 gram of magnesium and 4.8 grams of methyl iodide in 6 cc. of ether, and the reaction mixture is heated for 3 hours. Thereupon the solvent is distilled off and the residue further heated for 3 hours on the water bath. Thereto ice and subsequently dilute sulfuric acid is added and the mixture extracted with ether. On evaporating the ether and on saponification a secondary-tertiary dialcohol is precipitated as a difficultly soluble, crystalline compound which after repeated recrystallisation from alcohol shows a melting point of 182–186° C. The yield is about 0.53 gram.

On boiling this product for 2½ hours in glacial acetic acid solution and finally heating it for 15 minutes with acetic acid anhydride water is split off. After evaporating the anhydride the reaction product is repeatedly recrystallized from dilute alcohol whereby the acetate of the unsaturated alcohol $C_{22}H_{36}O$ is obtained in crystalline form and of a melting point of about 144° C. From the mother liquor of the acetate of 144° C. there can be obtained another product of the same composition having a melting point of 111° to 112° C.

125 mg. of the acetate of the melting point 144° C. are dissolved in 10 cc. of chloroform and treated with ozone while cooling with ice. The ozonized solution is then heated for ½ hour with 15 cc. of water to boiling. After evaporating the chloroform a crystalline residue remains which on repeated recrystallisation from dilute-methanol shows a melting point of 96° to 97° C. It represents the acetate of the 3-hydroxy etio allo cholanone-(17). The yield is about 110 mg.

The acetate can be saponified by heating for 1½ hours with 3 N methanolic potassium hydroxide solution. The keto alcohol of the formula $C_{19}H_{30}O_2$ is precipitated from the saponification solution after acidifying the same, by adding water thereto. On recrystallisation from dilute alcohol a product of the melting point 170° to 171° C. is obtained. The yield is about 75 mg.

As described in Example 2 the ozonide can be converted directly into the acetate of the disecondary dialcohol $C_{19}H_{32}O_2$ by dissolving the same in acetic acid ester and treating with hydrogen in the presence of a platinum catalyst. One may, of course, also hydrogenate the isolated acetate of the 3-hydroxy etioallocholanone-(17) or the hydroxy ketone itself to the corresponding dialcohol compounds.

Example 6

A solution of 2 grams of pregnenol-(3)-one-(20) of the melting point 190° C. in 80 cc. of waterfree ether is added while stirring to a solution of 2.4 g. of magnesium and 14.2 grams of methyl iodide in 80 cc. of waterfree ether. The ethereal reaction solution is boiled for 2 hours under reflux, the ether is distilled off, the residue decomposed with ice water, acidified with sulfuric acid and extracted with ether. After evaporating the ether the residue is heated for 5 hours with glacial acetic acid to boiling in order to complete the splitting off of water, and after evaporating the glacial acetic acid in a vacuum is distilled in a high vacuum. The twofold unsaturated alcohol obtained thereby is then heated with twice its weight of acetic acid anhydride and some sodium acetate whereby it is transformed into its acetate. The yield is 0.6 gram.

1.2 grams of the acetate are dissolved in 120 cc. of chloroform, to this solution there is added while cooling with ice, a solution of 0.53 gram of bromine in 53 cc. of chloroform. The solution of the dibromide obtained thereby, is then treated with ozone while cooling with ice, the chloroform is removed by evaporation at a low temperature in a vacuum and the residue is heated with zinc dust and glacial acetic acid for 3 hours to 100° C. After filtering and diluting with water the solution is extracted with ether, the ethereal extract is washed free from acid and the ether is evaporated. The remaining residue is the acetate of a keto cyclopentano dimethyl dodecahydro phenanthrol which on purification by recrystallisation from alcohol, if necessary, with the addition of animal charcoal, shows a melting point of 168° C. The yield is about 0.2 g.

On saponification the corresponding keto cyclopentano dimethyl dodecahydro phenanthrol is obtained. The melting point of the pure, freshly prepared compound is about 148° C., in the course of time, however, the melting point decreases to about 137° C. Most probably conversion into another polymorphous modification takes place on keeping the substance.

In the above given examples many changes and variations may be made by those skilled in the art. Thus, for instance, instead of using the free pregnanolones and pregnenolones or their acetyl derivatives as in Example 5, also other acyl compounds, such as the benzoate, the succinate and the like may be used. Furthermore the ethers, especially those with alkyl or aryl groups which can be split off very readily after the reaction, are suitable starting materials. Likewise those compounds wherein the OH-group in ring I is substituted by halogen can be employed with advantage for this purpose. From these latter products, for instance, from a 3-chloro pregnanone-(20) or 3-chloro pregnenone-(20) there are obtained chloroketones of the formula $C_{19}H_{29}OCl$ or $C_{19}H_{27}OCl$ respectively which are transformed in the same manner as described in the copending application Serial No. 754,854 filed November 24, 1934, into the final products described in the preceding examples, namely by converting the halogen into the hydroxy group, for instance, by reacting with the salts of organic carboxylic and sulfonic acids, such as potassium or silver acetate or the like. Thereby the esters are obtained which, on saponification, yield the free hydroxy ketones of the $C_{19}$-series. Of course, one may also employ other methods for the conversion of the halogen atom into the OH-group, as for instance, by directly exchanging them or by introducing intermediate substituents, such as the amino group.

Instead of the described Grignard reagents there may be used other Grignard compounds, such as ethyl magnesium bromide and the like or even other organo-metallic compounds, such as of zinc, mercury and the like as they are described, for instance, in Houben, Methoden der organischen Chemie, vol. 3, p. 61 to 75 (1933).

The splitting off of water from the secondary-tertiary alcohols obtained by means of Grignard reagent is preferably carried out as described, i. e., by boiling with acid anhydrides, such as acetic acid anhydride, or by heating the secondary-tertiary dialcohols obtained by means of Grignard reagent for several hours under reflux in a high vacuum to boiling; one may, however, use other dehydrating agents and methods, for instance, heating the grignardized compound after evaporation of the solvent, for several hours with an excess of the Grignard reagent.

The oxidation is preferably carried out by means of ozone; but, of course, other oxidation agents, such as potassium permanganate and the like, especially those which are capable of splitting up a double bond such as they are described, for instance, in Houben, Methoden der organischen Chemie, vol. 2, p. 127 to 132 (1923) can be used also.

The decomposition of the ozonides may be carried out by boiling the same with water or with aqueous solvents, such as dilute acids and the like. In the case of the unsaturated pregnanolones one may also combine the splitting up of the ozonide with the dehalogenization whereby the double bond in the ring II is regenerated.

The final products obtained, i. e., the 3-hydroxy etio cholanones-(17) and the 3-hydroxy etio cholenones-(17) and their hydroxy derivatives such as the 3-acyloxy, 3-alkoxy, 3-aryloxy or 3-halogen compounds, are converted by hydrogenation into the corresponding alcohols. As described in some of the examples one may, however, proceed in such a manner that, for instance, the ozonide is directly transformed into the corresponding dialcohol by a reductive splitting up of the same, for instance, by a treatment of a solution of the ozonide in an organic solvent with hydrogen in the presence of a catalyst. Of course, other reduction methods may be used likewise.

The regeneration of the double bond in ring II, in case unsaturated pregnanolones were used as starting materials, is not only carried out by treating with zinc dust and glacial acetic acid but also by other suitable methods, such as treatment with sodium iodide in acetone according to Finkelstein, or with sodium amalgam or in any other known manner, as described, for instance, in Houben, Methoden der organischen Chemie, vol. 2, p. 301 to 304 (1923).

The compounds obtained according to the process of this invention, which correspond to the following structural formulas:

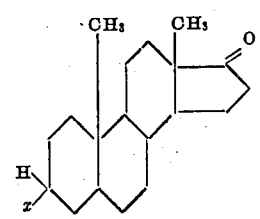 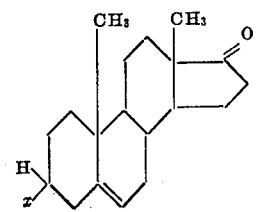

or their hydrogenation products of the following structural formulas:

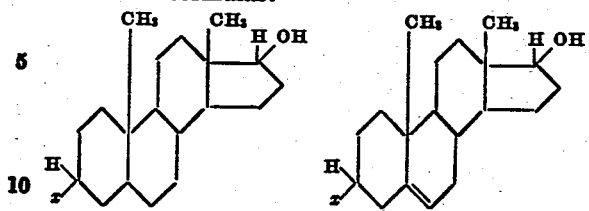

wherein $x$ represents either —OH, or —O—acyl, —O—aryl, —O—alkyl, or halogen are either themselves valuable therapeutic compounds which exhibit the effects of the male sex hormones, or can be converted into the same. Thus, for instance, compounds as obtained according to Examples 2, 4 and 5 have an activity of about 500–600γ/KE while their hydrogenation products are about three times as effective. Likewise the compound obtained according to Example 6 shows an activity of about 500γ/KE while the products obtained according to Examples 1 and 3 are not as effective as the above mentioned compounds.

Where in the claims I refer to "organo-metallic compound of the Grignard type", such expression is to be understood as including not only the Grignard reagents, but also other known compounds which can be employed for similar purposes, such as zinc and mercury compounds.

Of course, many other variations and changes in the reaction conditions and reagents may be made by those skilled in the art in accordance with the principles set forth herein and in the claims annexed hereto.

What I claim, is:

1. A method for converting compounds having the carbon atom system of the pregnan series, into compounds having the carbon atom system of the androstan series, comprising reacting compounds having the carbon atom system of the pregnan series and a keto group present in the side chain, with an organo-metallic compound of the Grignard type, splitting off water between the tertiary hydroxy group and the neighboring hydrogen atom of the product formed, thereby leaving a double bond in the side chain, oxidizing the dehydrated compound to split it at the place of the double bond present in the side chain, and isolating the reaction product having the carbon atom system of the androstan series.

2. A method for producing cyclopentano dimethyl polyhydro phenanthrene compounds of the general formula $C_{19}H_n(x)(y)$ wherein $n$ is an odd number from 27 to 29 inclusive, $y$ represents a member of the group of substituents consisting of the hydroxyl group and groups which on hydrolysis are transformed into the hydroxyl group, and $x$ is a member of the group consisting of the keto group =O and the secondary alcohol group

the composition of said compounds corresponding to the following structural formula

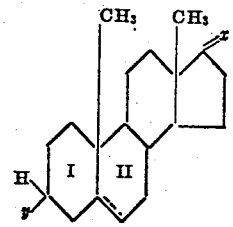

the dotted line in the formula indicating the probable position of the double bond in the case of the unsaturated compounds, comprising reacting pregnanolones of the general formula $C_{21}H_mO_2$, wherein $m$ is 34 in the case of the saturated and 32 in the case of the unsaturated compounds, and corresponding to the structural formula

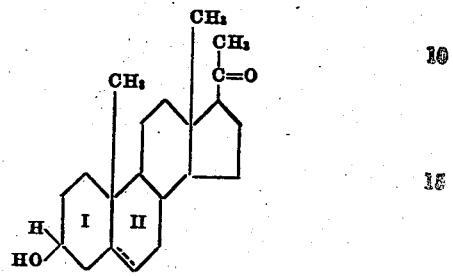

with an organo-metallic compound of the Grignard type, splitting off water between the tertiary hydroxy group and the neighboring hydrogen atom of the secondary-tertiary dialcohol obtained, thereby leaving a double bond in the side chain, oxidizing the unsaturated alcohol obtained to split the molecule at the point of such double bond, and isolating the reaction product.

3. A method according to claim 1 wherein the starting material contains a hydroxy group in ring I, and including the step of protecting such group during the reaction against the action of the reagents used by intermediate replacement with a removable substituent which is not affected by said reagents but can in turn be replaced with an OH-group.

4. A method according to claim 1, wherein the ring II of the substance to be decomposed contains a double bond, and including the step of reacting such substance, prior to the oxidation, with a material capable of saturating such bond.

5. A method according to claim 1, wherein ozone is used as the oxidizing agent.

6. A method according to claim 1 wherein the hydroxy group in ring I is protected during the reaction against the action of the reagents used by intermediate transformation into an ester group.

7. A method according to claim 1, wherein the double bond in ring II, in the case of unsaturated compounds, is protected during the reaction against the action of the reagents used, by intermediate saturation with halogen.

8. A method according to claim 1, wherein ozone is used as the oxidizing agent, and wherein the ozonide obtained is split up by a treatment with agents which at the same time exert a reducing effect upon the keto group formed, and isolating the dialcohol compound obtained.

9. A method according to claim 1, wherein the reaction products are subjected to the action of reducing agents capable of reducing the keto group formed to a secondary alcohol group.

10. A method according to claim 1, wherein the splitting off of water between the tertiary hydroxy group and the neighboring hydrogen atom of the secondary-tertiary dialcohol obtained is effected by heating the dialcohol in a high vacuum under reflux to boiling.

11. A method according to claim 1, wherein the splitting off of water between the tertiary hydroxy group and the neighboring hydrogen atom of the secondary-tertiary dialcohol obtained is effected by heating the dialcohol with an excess of the organo-metallic compound.

12. A method according to claim 1 wherein the starting material contains a hydroxy group in ring I and including the steps of protecting such group during the reaction against the action of the reagents used by intermediate replacement with a removable substituent which is not affected by said reagents but can in turn be replaced with an OH-group, and subsequently reacting the product obtained with an hydroxyl-containing compound capable of replacing the substituent with an hydroxy group.

13. A method according to claim 1, wherein the starting material contains a double bond in ring II, and including the step of attaching to such substance, prior to the oxidation, for temporary saturation of the double bond, substituents which can be removed to restore the double bond, and subsequently removing such substituents.

14. A method according to claim 1, wherein the organo-metallic compound is an organo-magnesium compound.

15. A method according to claim 1, wherein the double bond in ring II, in the case of unsaturated compounds, is protected during the reaction against the action of the reagents used, by intermediate saturation with halogen, the oxidizing agent being ozone, and wherein the decomposition of the ozonide is carried out by means which at the same time exert a dehalogenizing effect so that the double bond in ring II is regenerated.

16. A method according to claim 1, wherein the double bond in ring II, in the case of unsaturated compounds, is protected during the reaction against the action of the reagents used, by intermediate saturation with halogen, the oxidizing agent being ozone, and wherein the dehalogenation is carried out by treating with zinc dust and glacial acetic acid.

17. A method for producing a keto cyclopentano dimethyl tetradekahydro phenanthrol of the general formula $C_{19}H_{29}O(x)$ corresponding to the structural formula

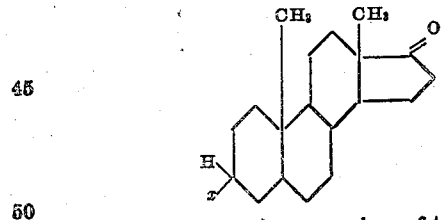

wherein $x$ represents a member of the group consisting of the hydroxy group and groups which on hydrolysis are retransformed into a hydroxy group, comprising reacting a pregnanolone compound of the general formula $C_{21}H_{33}O(x)$ corresponding to the structural formula

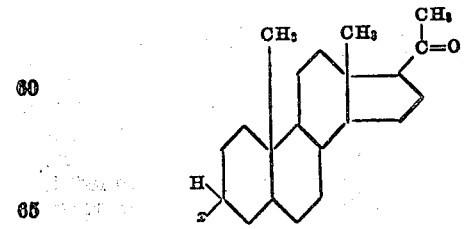

with an organo-metallic compound of the Grignard type, splitting off water between the tertiary hydroxy group and the neighboring hydrogen atom of the secondary-tertiary dialcohol compound obtained, oxidizing the unsaturated alcohol compound formed to split the molecule at the point of the double bond, and isolating the reaction product $C_{19}H_{29}O(x)$.

18. A method for producing a keto cyclopentano dimethyl dodekahydrophenanthrol of the general formula $C_{19}H_{27}O(x)$ corresponding to the structural formula

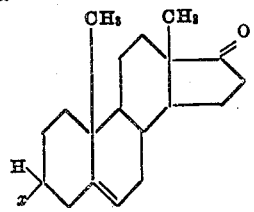

wherein $x$ represents a member of the group consisting of the hydroxy group and groups which on hydrolysis are retransformed into a hydroxy group, comprising reacting a pregnenolone of the general formula $C_{21}H_{31}O(x)$ corresponding to the structural formula

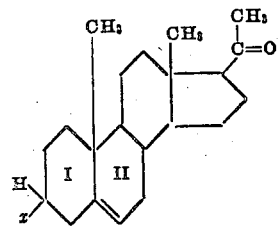

with an organo-metallic compound of the Grignard type, splitting off water between the tertiary hydroxy group and the neighboring hydrogen atom of the secondary-tertiary dialcohol compound obtained, treating the unsaturated alcohol compound formed with halogen so as to saturate the double bond in ring II, thereupon subjecting the halogenated compound to the action of an oxidizing agent so as to split the molecule at the point of the double bond in the side chain, removing the halogen by reacting with agents capable of regenerating the double bond in ring II, and isolating the reaction product $C_{19}H_{27}O(x)$.

19. An alcohol compound of the general formula $C_{21}H_nOH(x)R$ wherein $n$ is 33 in the case of the saturated and 31 in the case of the unsaturated compound, $x$ is a member of the group consisting of the hydroxy group and groups which on hydrolysis are retransformed into a hydroxy group, and R is a member of the group consisting of alkyl and aryl radicals, the composition of the compound corresponding to the following structural formula

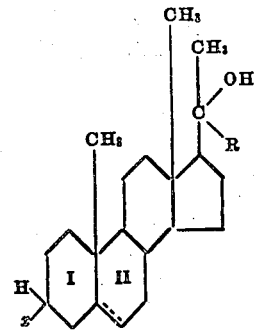

the dotted line in ring II indicating the point of unsaturation when $n$ is 31.

20. An alcohol compound of the general formula $C_{21}H_n(x)R$ wherein $n$ is 32 when the compound is saturated and 30 when it is unsaturated, $x$ is a member of the group consisting of the hydroxy group and groups which on hydrolysis are re-transformed into a hydroxy group, and R is a member of the group consisting of alkyl and aryl radicals, the composition of said compound corresponding to the following structural formula

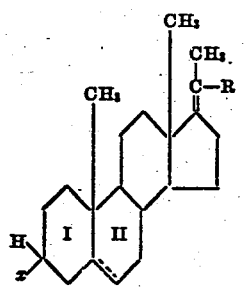

the dotted line in ring II indicating the position of the double bond in the nucleus when $n$ is 30.

21. A cyclopentano dimethyl tetradekahydro phenanthrene compound of the general formula $C_{19}H_{30}OH(x)$ wherein $x$ is a group, other than an O-acyl group, which can replace a hydroxy group and can be transformed into a hydroxy group, the composition of the compound corresponding to the following structural formula

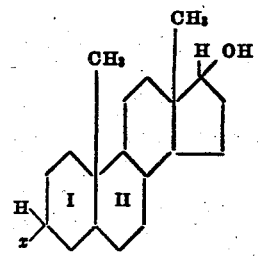

said compound having a physiological activity similar to that of the male sex hormones.

FRIEDRICH HILDEBRANDT.